UNITED STATES PATENT OFFICE 2,320,678

SYNTHETIC TANNINS

Edmond Marie Tassel, Senlis, France; vested in the Alien Property Custodian

No Drawing. Application October 19, 1939, Serial No. 300,233. In France November 25, 1938

6 Claims. (Cl. 260—49)

The present invention concerns a process for the manufacture of water-soluble products having tanning and dispersing properties and the products themselves obtained according to this process.

Numerous methods have already been proposed for the manufacture of synthetic tannins starting from phenols substituted in position para to the OH group. These phenols are rendered soluble either by sulphonation, by condensation of their methylol derivatives with aromatic sulphonic acids or by treatment with formol and alkaline sulphites. This latter method necessitates in certain cases the employment of elevated temperature and a pressure above atmospheric pressure.

The process which forms the subject of the present invention consists in condensing with alkaline sulphites, in aqueous medium and with gradual addition of a strong acid during condensation, methylol derivatives of phenols of general formula:

in which R represents an alkyl, aryl, hydroxyaryl, aralkyl, hydroxyaralkyl or cycloalkyl radicle, and X a simple bond or an $SO_2$ group and in which the aryl nuclei may contain substituents such as halogen atoms or the methyl group.

Due to this gradual addition of strong acids the formation of the w-sulphonated derivative is considerably accelerated so that in all cases the employment of a pressure above atmospheric pressure is avoided.

By this process water-soluble products are obtained which may be used in tanning as tanning agents, as dispersing or whitening agents, in the textile industry for dyeing, printing and finishing as dispersing agents or resists, they may likewise in certain cases be used as fungicides.

Amongst the phenols, to which the present invention is applicable, one may mention by way of examples p-phenyl-phenol, 4.4'-dihydroxydiphenylmethane, 4.4' - dihydroxydiphenylpropane, 4.4' - dihydroxydiphenylsulphone, their homologues and their halogenated derivatives.

According to the invention, firstly one of the phenols defined above or a mixture of such phenols or even a mixture of phenols mainly constituted by phenols corresponding to the general formula mentioned above, is condensed with formaldehyde according to the general methods known for the preparation of methylol derivatives. The methylol derivatives thus obtained are treated in aqueous solution at temperatures not exceeding the boiling point of the reaction medium under atmospheric pressure (i. e. 100–110° C.) with salts of sulphurous acid. During this reaction a strong acid is slowly introduced so that it is present to the limit of precipitation of the methylol derivatives. The addition of acid is stopped when a test portion diluted with several parts of water is stable at an acidity corresponding to a pH of 1.5 to 2.5.

The course of the condensation reaction, according to this invention, appears to be very complex. I believe that it may be divided into two steps which are practically concomitant and which are as follows:

(a) A step in which the starting material is rendered soluble. For example, in the case of dihydroxydiphenylsulfone, the reaction, using sodium sulfite, is as follows:

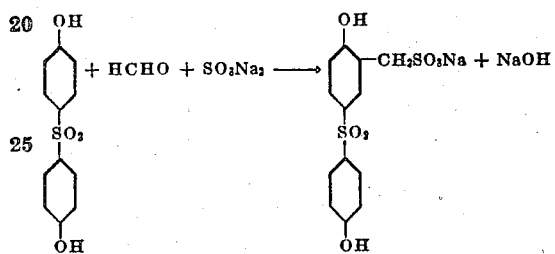

In this case, the group $CH_2SO_3Na$ is the solubilizing group.

(b) A step of polymerization, which is necessary for a product having tanning properties. The polymerization generally requires an alkaline or acid medium as a catalyst. The acid reaction ordinarily gives tannins that permit of obtaining well tanned but flat and brittle leathers. The alkaline reaction produces tannins which permit of obtaining well swollen and supple leathers, but if the catalyst is too strong, it produces an obstruction of the fiber and prevents the tanning from going to the core. According to the present invention, the addition of alkaline sulphite, then of acid, insures the solubility of the condensation product of the phenol and the formol which are employed, while maintaining a pH which is very near neutrality during the entire reaction, so that the condensation occurs very slowly with respect to the solubilization.

The product is adjusted to the desired pH for the employment for which the product is destined, for instance according to the degree of swelling or the rapidity of tanning which is desired.

The tannins which are obtained according to the present invention possess the following properties:

(a) The degree of polymerization and the proportion of non-tanning substances may be controlled;

(b) The swelling power may be controlled according to the duration of the reaction;

(c) The tannins give leathers in which the fibers are well open and which are white or light colored;

(d) The solubility may be controlled at will according to the duration of the reaction and the final pH.

The following examples illustrate the present invention without limiting it:

Example 1

At the boiling point, 250 grams of dihydroxydiphenylsulphone are condensed with 110 grams of formol in the presence of 650 grams of water and 266 grams of caustic soda lye of 35° Bé. When the condensation is finished 300 grams of sodium bisulphite of 35° Bé. are added and the mixture is brought to boiling, sulphuric acid is added in small portions so as to maintain the mixture at the precipitation limit of the product until a test portion is soluble in water at a pH of 2.2. The product obtained may be freed from the excess of soluble salt by salting out.

Example 2

At the boiling point 228 grams of diphenylolpropane are condensed with 62 grams of formol of 30% strength and 75 grams of caustic soda solution of 35° Bé. in the presence of 100 grams of water. After condensation 170 grams of sodium bisulphite are added and the product is brought to boiling. Then sulphuric acid is added drop by drop until a test portion is stable to water at a pH of 1.5.

Example 3

At the boiling point 250 grams of dihydroxydiphenyl-sulphone are condensed with 120 grams of formol of 30% strength and 150 grams of caustic soda solution of 30% strength in the presence of 350 grams of water.

To the condensed product is added 300 grams of sodium bisulphite of 35° Bé. Boiling is maintained and sulphuric acid diluted in its own volume of water is added in portions maintaining the reaction mixture at the precipitation limit of the product. The operation is stopped when a test portion is soluble in water acidified at a pH of 2.1.

Example 4

At the boiling point 228 grams of diphenylolpropane are condensed with 62 grams of formol of 30% strength and 50 grams of caustic soda solution of 36° Bé. and then 110 grams of sodium bisulphite of 35° Bé. are added and hydrochloric acid drop by drop, maintaining the boiling so that the product remains soluble and transparent. The addition of acid is stopped when the product dissolves in acidified water at a pH of 1.9, then the syrupy product obtained is brought to a suitable dilution.

Example 5

100 grams of dihydroxydiphenylsulphone and 136 grams of diphenylolpropane are condensed with 70 grams of formol of 30% strength and 55 grams of caustic soda solution of 35° Bé. Then 140 grams of sodium bisulphite of 35° Bé. are added and after three hours of boiling diluted sulphuric acid is added sufficiently slowly so that the reaction mass remains soluble and transparent. The addition of acid is stopped when the product is stable to acidified water of pH 2.8.

I claim:

1. A process for the manufacture of synthetic tannins consisting in condensing with alkaline sulphites, in an aqueous medium and with gradual addition of a strong acid during the condensation, methylol derivatives of phenols of the general formula:

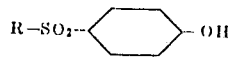

in which R is a member of the group consisting of alkyl, aryl, hydroxyaryl, aralkyl, hydroxyaralkyl and cycloalkyl radicals.

2. A process for the manufacture of synthetic tannins consisting in condensing with alkaline sulphites, in an aqueous medium and with gradual addition of a strong acid during the condensation, methylol derivatives of phenols of the general formula:

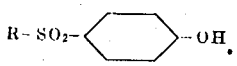

in which R is a member of the group consisting of alkyl, aryl, hydroxyaryl, aralkyl, hydroxyaralkyl and cycloalkyl radicals and in which the aryl nuclei contains substituents formed by halogen atoms.

3. A process for the manufacture of synthetic tannins consisting in condensing with alkaline sulphites, in an aqueous medium and with gradual addition of a strong acid during the condensation, methylol derivatives of phenols of the general formula:

in which R is a member of the group consisting of alkyl, aryl, hydroxyaryl, aralkyl, hydroxyaralkyl and cycloalkyl radicals and in which the aryl nuclei contain substituent formed by one methyl group.

4. Synthetic tannins obtained in accordance with the process claimed in claim 1.

5. Synthetic tannins obtained in accordance with the process claimed in claim 2.

6. Synthetic tannins obtained in accordance with the process claimed in claim 3.

EDMOND MARIE TASSEL.